United States Patent

Steeby

(10) Patent No.: US 6,491,603 B1
(45) Date of Patent: Dec. 10, 2002

(54) AUTOMATED TRANSMISSION SHIFT CONTROL

(75) Inventor: Jon A. Steeby, Schoolcraft, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/660,319

(22) Filed: Sep. 12, 2000

(51) Int. Cl.⁷ .............................................. B60K 41/06
(52) U.S. Cl. ........................ 477/118; 477/121; 477/125
(58) Field of Search .................... 477/115, 118, 477/121, 125; 701/54

(56) References Cited

U.S. PATENT DOCUMENTS

| | | | |
|---|---|---|---|
| 4,361,060 A | 11/1982 | Smyth | 74/866 |
| 4,595,986 A | 6/1986 | Daubenspeck et al. | 364/424.1 |
| 4,648,290 A | 3/1987 | Dunkley et al. | 477/78 |
| 4,850,236 A | 7/1989 | Braun | 74/337 |
| 4,947,331 A | 8/1990 | Speranza | 364/424.1 |
| 5,172,609 A | 12/1992 | Nitz et al. | 74/866 |
| 5,219,391 A | 6/1993 | Edelen et al. | 74/335 |
| 5,272,939 A | 12/1993 | Markyvech | 74/866 |
| 5,335,566 A | 8/1994 | Genise | 74/335 |
| 5,389,053 A | 2/1995 | Steeby et al. | 477/123 |
| 5,390,561 A | 2/1995 | Stine | 74/331 |
| 5,409,432 A | 4/1995 | Steeby | 477/71 |
| 5,425,689 A | 6/1995 | Genise | 477/120 |
| 5,435,212 A | 7/1995 | Menig | 74/745 |
| 5,444,623 A * | 8/1995 | Genise | 477/125 |
| 5,479,345 A | 12/1995 | Amsallen | 364/424.1 |
| 5,487,004 A | 1/1996 | Amsallen | 364/424.1 |
| 5,489,247 A | 2/1996 | Markyvech | 447/120 |
| 5,490,063 A | 2/1996 | Genise | 364/424.1 |
| 5,509,867 A | 4/1996 | Genise | 477/120 |
| 5,533,946 A | 7/1996 | Markyvech | 477/78 |
| 5,582,069 A | 12/1996 | Genise | 74/335 |
| 5,620,392 A | 4/1997 | Genise | 477/120 |
| 5,655,407 A | 8/1997 | Dresden et al. | 74/336 |
| 5,713,445 A | 2/1998 | Davis et al. | 192/35 |
| 5,737,978 A | 4/1998 | Stine | 74/606 |
| 5,743,143 A | 4/1998 | Carpenter et al. | 74/335 |
| 5,754,968 A * | 5/1998 | Hedstrom | 477/121 |
| 5,766,111 A | 6/1998 | Steeby et al. | 477/124 |
| 5,902,210 A * | 5/1999 | Kobayashi et al. | 477/118 |
| 6,244,986 B1 * | 6/2001 | Mori et al. | 477/46 |

FOREIGN PATENT DOCUMENTS

| | | |
|---|---|---|
| EP | 0 670 440 A | 9/1995 |
| EP | 1 013 973 A | 6/2000 |
| EP | 1 020 663 A | 7/2000 |

* cited by examiner

*Primary Examiner*—Sherry Estremsky
(74) *Attorney, Agent, or Firm*—Kevin M. Hinman; Howard D. Gordon

(57) ABSTRACT

A method/system for controlling shifting in an automated mechanical transmission system (10) utilized on a vehicle having an engine brake (ECB), preferably controlled by an ECU (28). Shifts to be initiated while the engine brake is active and engine brake assisted upshifts are evaluated with regard to the engine built in engine brake deactivation response delay ($T_{ECBDEACTIVATE}$).

3 Claims, 3 Drawing Sheets

AUTOMATED TRANSMISSION SHIFT CONTROL

RELATED APPLICATIONS

This application is related to copending U.S. Ser. No. 09/231,951 titled AUTOMATED TRANSMISSION DOWNSHIFT CONTROL and Ser. No. 09/232,252 titled AUTOMATED TRANSMISSION UPSHIFT CONTROL, both filed Jan. 14, 1999 and assigned to EATON CORPORATION, assignee of this application.

This application is also related to copending U.S. Ser. No. 09/563,097 titled AUTOMATED TRANSMISSION UPSHIFT CONTROL, filed May 2, 2000 and assigned to Eaton Corporation.

BACKGROUND OF THE INVENTION

1. Field of the Invention

The present invention relates to a control method/system for controlling shifting in an at least partially automated mechanical transmission system. In particular, the present invention relates to the control of shifting in a vehicular automated mechanical transmission system wherein the system senses conditions indicative of a shift from a currently engaged gear ratio (GR) and evaluates, in sequence, the desirability of skip shifts and then single shifts and commands shifts deemed desirable.

More particularly, the present invention relates to control logic for exaluating shift feasibility and target gear identity in view of built-in engine response delays provided to assure proper engine brake deactivation.

2. Description of the Prior Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639. The use of engine brakes (also known as compression brakes, exhaust brakes or Jake brakes) and transmission controls utilizing same are known in the prior art, as may be seen by reference to U.S. Pat. Nos. 5,409,432 and 5,425,689, the disclosures of which are incorporated herein by reference.

Controls for automated mechanical transmission systems, especially wherein shifting is accomplished while maintaining the master clutch engaged, wherein single and/or skip shift feasibility is evaluated are known in the prior art, as may be seen by reference to U.S. Pat. Nos. 4,576,065; 4,916,979; 5,335,566; 5,425,689; 5,272,939; 5,479,345; 5,533,946; 5,582,069; 5,620,392; 5,489,247; 5,490,063 and 5,509,867, the disclosures of which are incorporated herein by reference.

It is also known that manufacturers of diesel engines for heavy-duty trucks, such as Caterpillar, Cummins, Detroit Diesel, etc., build in a response delay in their electronically controlled engines to allow proper engine brake deactivation. This is done to prevent fueling of the engine if the brake is still active which might cause valve and/or engine damage. This delay typically varies (from about 100 ms to about 500 ms) depending on the type of engine and/or engine brake.

SUMMARY OF THE INVENTION

The control of the present invention provides an improved control for a vehicular automated mechanical transmission system which will sense conditions indicative of shifting from a currently engaged gear ratio, and will evaluate, in sequence, the desirability of large skip shifts, then single skip shifts, and then single shifts, and will command a shift to the first target ratio deemed to be desirable under current vehicle operating conditions.

In a preferred embodiment of the present invention, by setting (i) a maximum acceptable shift time for completing upshifts and (ii) upshift feasibility rules to determine if a proposed shift is feasible under current vehicle operating conditions. The shift feasibility rules comprise a two-part test, (a) can the upshift be completed above a minimum engine speed? and (b) when completed, will the engine, in the target ratio, provide sufficient torque at the drive wheels to allow at least a minimum vehicle acceleration?

The present invention, determines the upshift brake deactivation delay provided for a particular engine and evaluates possible target gear ratios based upon the delay.

The above is accomplished by determining that shifts initiated with the engine brake active (typically only coasting downshifts) and engine brake aided upshifts will take a longer time to complete due to the built in engine brake deactivation delay.

Accordingly, an improved shift control for automated mechanical transmissions is provided which will automatically evaluate and command desirable skip and then single shifts.

This and other objects and advantages of the present invention will become apparent from a reading of the following description of the preferred embodiment taken in connection with the attached drawings.

DESCRIPTION OF THE PREFERRED EMBODIMENT

Figure 1:
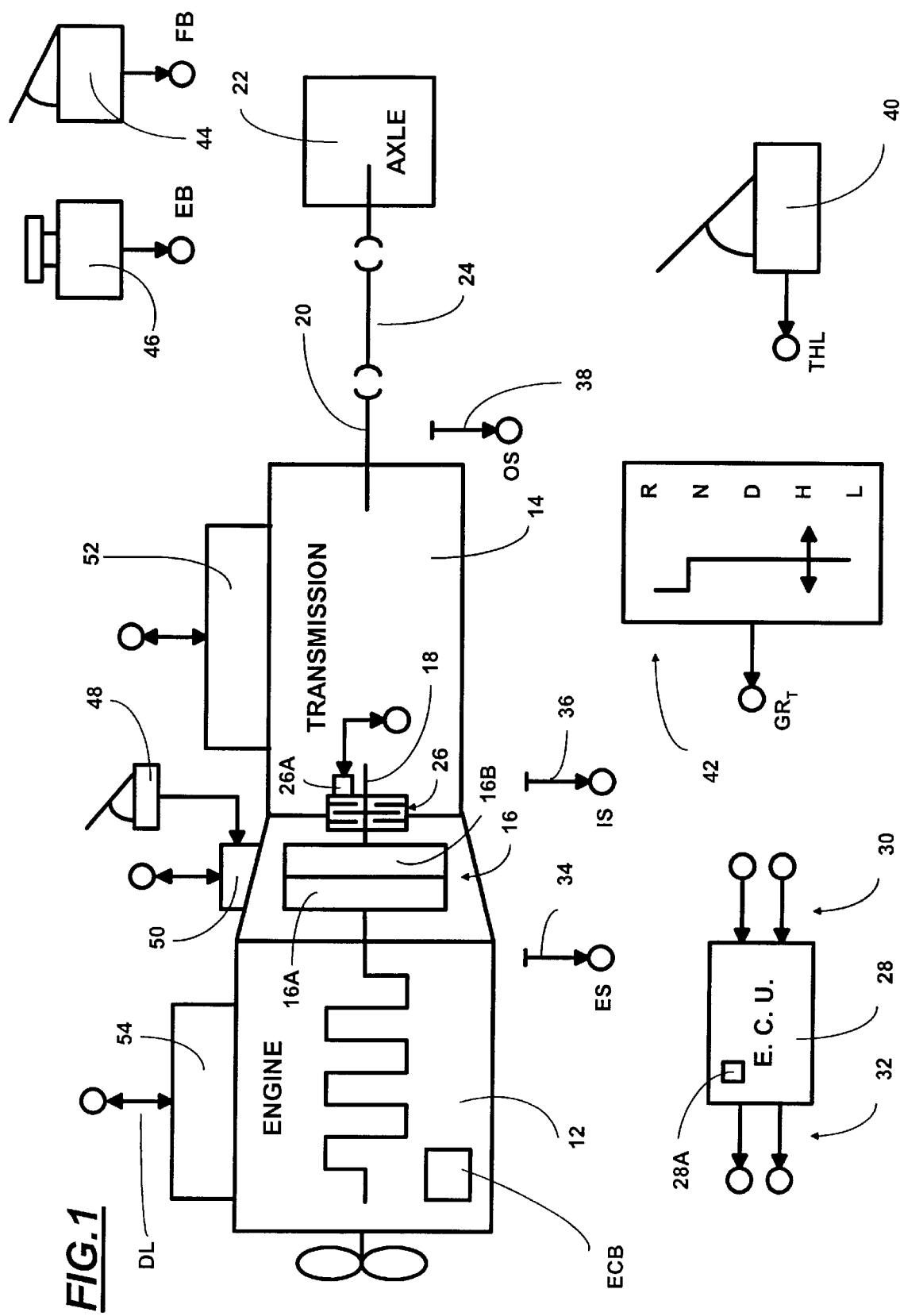
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmissions of this type, especially as used with heavy-duty vehicles, typically have 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal (GRT) indicative thereof.

As is known, if the clutch is engaged, the rotational speed of the engine may be determined from the speed of the input shaft and/or the speed of the output shaft and the engaged transmission ratio (ES=IS=OS*GR).

System 10 also may include sensors 44 and 46 for sensing operation of the vehicle foot brake (also called service brakes) and engine brakes, respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. In the preferred embodiment, the clutch is manually controlled and used only to launch the vehicle (see U.S. Pat. Nos. 4,850, 236; 5,272,939 and 5,425,689). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391. Actuator 52 may shift the main and/or auxiliary section of transmission 14. The engaged and disengaged condition of clutch 16 may be sensed by a position sensor (not shown) or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

Engine 12 is provided with an engine brake, such as an engine compression brake ECB, which may be manually controlled by device 46 and/or automatically controlled. The engine brake may be activated by ECU 28 to provide ECB-aided upshifts for quicker upshifted, see U.S. Pat No. 5,655,407, the disclosure of which is incorporated herein by reference.

As is known, to prevent damage to the engine and/or engine valves caused by fueling the engine while the engine brake is active, a time delay is provided after the ECB is deactivated during which the engine is not fueled regardless of fueling commands on the data link. This ECB deactivation delay ($T_{ECBDEACTIVATE}$) is typically in the range of 100 ms to 500 ms and varies with engine and/or ECB supplier.

As is known, for automated shifting, the ECU 28 must determine when upshifts and downshifts are required and if a single or skip shift is desirable (see U.S. Pat. Nos. 4,361,060; 4,576,065; 4,916,979 and 4,947,331).

Figure 2:
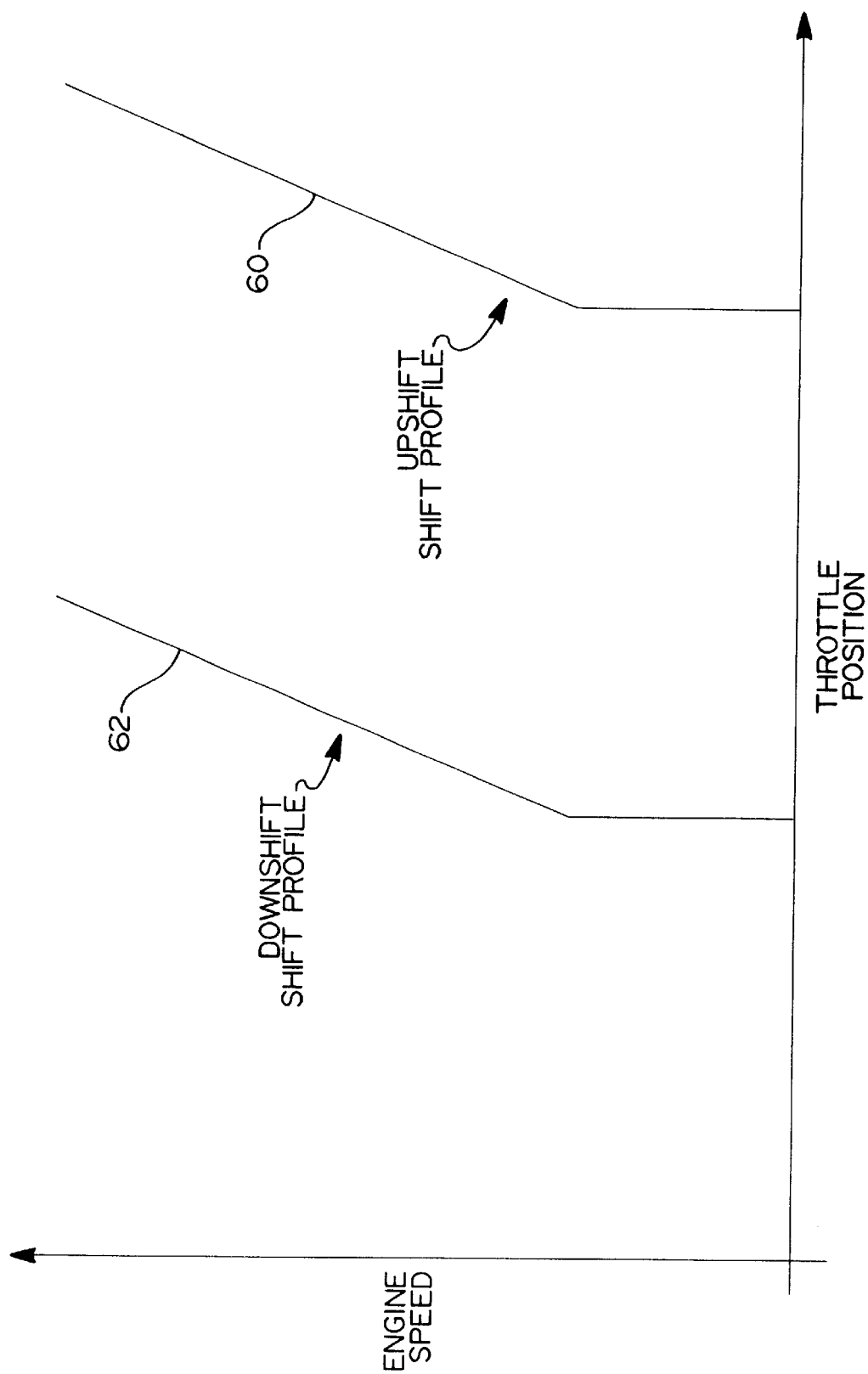
FIG. 2 is a schematic illustration, in graphical format, illustrating shift point profiles for the transmission system of FIG. 1 according to the present invention.

FIG. 2 is a graphical representation of shift point profiles utilized to determine when shift commands should be issued by the ECU 28 to the shift actuator 52. Solid line 60 is the default upshift profile, while solid line 62 is the default downshift profile. As is known, if the vehicle is operating to the right of upshift profile 60, an upshift of transmission 14 should be commanded, while if the vehicle is operating to the left of downshift profile 62, a downshift should be commanded. If the vehicle is operating in between profiles 60 and 62, no shifting of the transmission is then required.

Shift profile 60 is a graphical representation of the engine speeds at which upshifts from a currently engaged ratio (GR) are indicated ($ES_{U/S}$) for various degrees of throttle displacement (i.e., demand). Shift profile 62 is a graphical representation of the engine speeds at which downshifts are indicated ($ES_{D/S}$)

According to the control of a preferred embodiment of the present invention, if an upshift from a currently engaged ratio (GR) is required (i.e., if at current throttle displacement engine speed (ES) is greater than the upshift engine speed ($ES_{U/S}$) on shift point profile 60), a sequence is initiated for identifying the desirable upshift target ratio ($GR_{TARGET}$), if any. The control, in sequence, will evaluate skip and then single upshifts for desirability and command an upshift to the first potential target ratio deemed desirable.

A maximum time for completion of an upshift is established based upon considerations for shift quality, vehicle performance, etc. For heavy-duty trucks, by way of example, this time value may have a value of about 1.0 to 2.0 seconds.

A two-part feasibility test is established:
(1) Will the engine speed be at a synchronous value above a preselected minimum engine speed $ES_{MIN}$, given current/assumed engine and vehicle deceleration rates? The $ES_{MIN}$, by way of example, is selected at about 1100 to 1300 rpm, which for a typical heavy-duty diesel engine is at or near a peak torque rpm. The engine deceleration rate may be evaluated both with or without the use of engine braking. This logic may be appreciated by reference by U.S. Pat. Nos. 5,335,566 and 5,425,689, the disclosures of which are incorporated herein by reference. Use of engine brakes (also called exhaust and Jake brakes) to enhance upshifting is known, as may be seen by reference to U.S. Pat. No. 5,409,432; and
(2) At completion of a proposed upshift, will torque at the drive wheels provide sufficient torque for at least minimal vehicle acceleration? (See U.S. Pat. Nos. 5,272,939 and 5,479,345, the disclosures of which are incorporated herein by reference.

If one or both of these parts of the feasibility test are not satisfied, the upshift to an evaluated target ratio (GR+1, 2, 3, . . . ) is not feasible and will not be commanded.

Similar logic is utilized to evaluate the feasibility of skip and then single downshifts (see copending U.S. Ser. No. 09/231,951).

In evaluating the desirability and feasibility of engaging a particular potential target gear ratio, the expected time required to complete the shift and/or to complete the shift and then resume fueling the engine, is an important control parameter.

According to the present invention, the control logic takes into account that in shifts occurring when the engine brake is active, (usually before a coasting downshift) will take longer because fuel control to break torque (see U.S. Pat. No. 4,850,236) will commence until after the compression brake deactivation delay ($T_{ECBDEACTIVATE}$) has expired and, after an ECB-assisted upshift, the engine will not begin to be refueled to increase torque until after the compression brake deactivation delay has expired.

The value of the deal may be programmed into the system controller (28) logic upon assembly of the system, may be read on the datalink and/or may be imperically determined.

Accordingly, upon sensing a shift to be initiated with the engine brake active and/or if evaluating a potential engine brake assisted shift is evaluated on the basis of requiring an extended period of time to account for the built in engine response delay.

Figure 3:
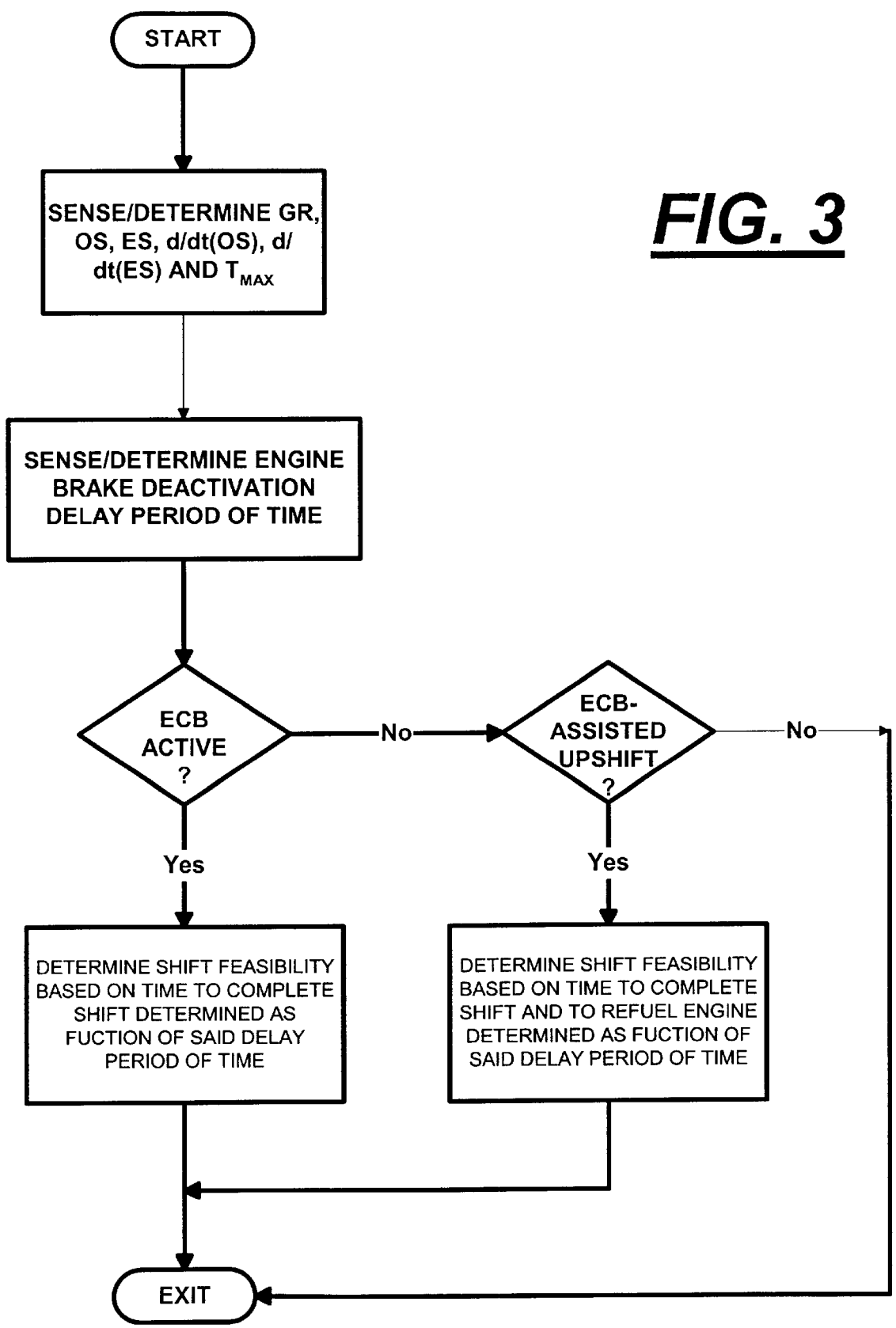
FIG. 3 is a schematic illustration, in flow chart format, of the control of the present invention.

The control of the present invention is shown in flow chart format in FIG. 3.

Accordingly, it may be seen that an improved control system/method for controlling upshifting in an at least partially automated mechanical transmission system in a vehicle preferably having a manually operated engine brake system is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling automatic upshifting in a vehicular automated mechanical transmission system (10) for a vehicle comprising a fuel-controlled engine (12), an engine brake (ECB), a multiple-speed mechanical transmission (14), and a controller (28) for receiving input signals (30) including one or more of signals indicative of engine speed (ES), engaged gear ratio (GR) and vehicle speed (OS), and to process said input signals in accordance with with logic rules to issue command output signals (32) to transmission system actuators including a transmission actuator (52) effective to shift said transmission, and an engine controller (54) effective to control fueling of said engine, said engine controller adapted to delay, for a set period of time ($T_{ECBDEACTIVATE}$) increased fueling of the engine after deactivation of said engine brake, said method characterized by:

if said engine brake is active, determining if shifts from a currently engaged gear ratio into a potential target gear ratio are feasible based upon an expected time to complete said shift into said potential target gear ratio, said expected time determined in accordance with said set period of time.

2. The method of claim 1 further comprising:

determining if engine brake assisted upshifts from a currently engaged gear ratio into a potential target gear ratio are feasible based upon an expected time to complete said shift into said potential target ratio and to refuel said engine to a selected output torque, said expected time determined in accordance with said set period of time.

3. A method for controlling automatic upshifting in a vehicular automated mechanical transmission system (10) for a vehicle comprising a fuel-controlled engine (12), an engine brake (ECB), a multiple-speed mechanical transmission (14), and a controller (28) for receiving input signals (30) including one or more of signals indicative of engine speed (ES), engaged gear ratio (GR) and vehicle speed (OS), and to process said input signals in accordance with with logic rules to issue command output signals (32) to transmission system actuators including a transmission actuator (52) effective to shift said transmission, and an engine controller (54) effective to control fueling of said engine, said engine controller adapted to delay, for a set period of time ($T_{ECBDEACTIVATE}$) increased fueling of the engine after deactivation of said engine brake, said method characterized by:

determining if engine brake assisted upshifts from a currently engaged gear ratio into a potential target gear ratio are feasible based upon an expected time to complete said shift into said potential target ratio and to refuel said engine to a selected output torque, said expected time determined in accordance with said set period of time.

* * * * *